Patented Sept. 20, 1949

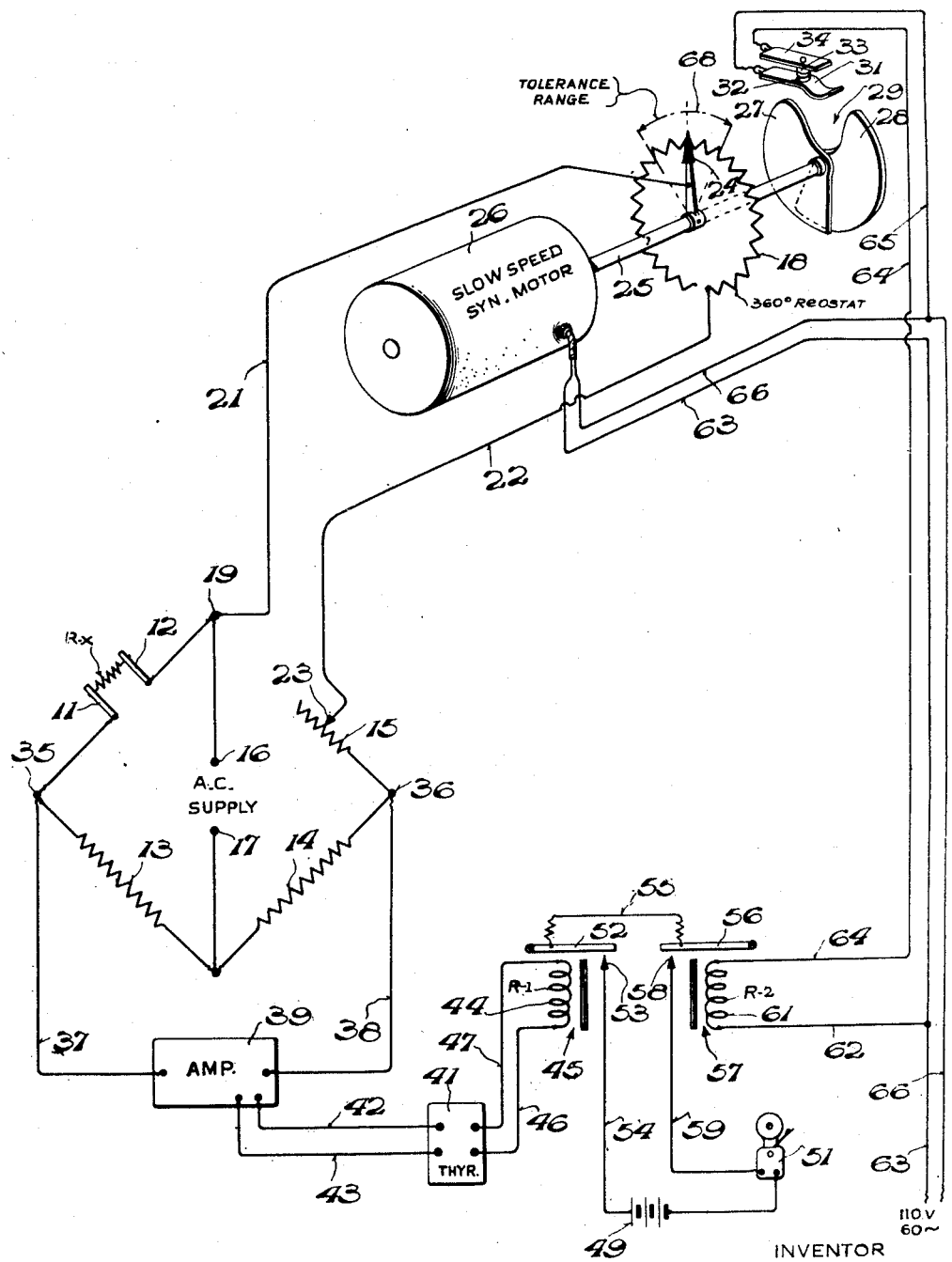

2,482,196

UNITED STATES PATENT OFFICE 2,482,196

RESISTANCE MEASURING APPARATUS

Robert B. Marye, Towson, Md., assignor to Bendix Aviation Corporation, South Bend, Ind., a corporation of Delaware Application February 6, 1945, Serial No. 576,475

3 Claims. (Cl. 175—183)

The present invention relates to resistance measuring apparatus, and more particularly to resistance measuring devices of an automatic character, in which the resistor is connected to a test circuit and its resistance measured by automatic or semi-automatic means.

While it has been heretofore proposed to measure resistance by automatic methods and apparatus, they have not been altogether successful, since most of them check either the lower or the upper, but not both resistance tolerances, and they have not yielded results having the degree of accuracy desired.

It is the major object of this invention to provide a novel apparatus for checking resistance, in which any desired upper or lower limit of resistance values may be set up, and a rejection circuit will be energized whenever the resistance of the resistor under test falls above or below the tolerance range.

A further important object is to provide a resistance measuring apparatus of novel construction in which a variable resistor is caused to cyclically go through its maximum and minimum resistance values, and control means are provided for automatically energizing the rejection circuit whenever the resistor under test is balanced by the variable resistor and the latter is in a predetermined region of its resistance range.

Further objects will become apparent as the specification proceeds in conjunction with the annexed drawing, and from the appended claims.

The single figure of the drawing diagrammatically illustrates one form of apparatus embodying the invention.

With continued reference to the drawing, the resistor undergoing test is designated Rx, which may be placed in the test circuit in any suitable manner, as, for instance, by means of a pair of spring clips 11 and 12. The resistor forms one leg of a bridge having fixed resistances 13 and 14, and a variable resistor 15. Power is supplied to the bridge by terminals 16 and 17, and it may be either alternating or direct current, as desired.

Resistor 15 is adjusted, in the case of a temperature or humidity responsive resistor undergoing test, to provide a degree of compensation corresponding to room temperature or humidity respectively.

The bridge is cyclically brought to balance by means of a variable resistor 18, connected at one side to bridge terminal 19 by means of a lead 21, and at the other side by a lead 22 to the movable element 23 of resistor 15. Resistor 18 has a rotatable contact or slider element 24 which cooperates with the convolutions of resistor 18 and is carried by shaft 25 driven by a synchronous motor 26, the latter embodying speed reducing gearing (not shown), so that shaft 25 rotates at sufficiently slow speed to permit the resistors under test to be inserted and removed at a predetermined point in each revolution of shaft 25.

Shaft 25 also rigidly carries a cam made up of relatively angularly adjustable sections 27 and 28 which may be adjusted to vary the angular extent of notch 29 of the cam, as well as the angular position of the notch with respect to resistor element 23. The cam coacts with a switch element 31, which is sufficiently wide to coact with both cam sections, and it carries a contact 32 coacting with a contact 33 carried by a switch element 34. The purpose and function of this switch will be hereinafter described.

From the foregoing disclosure it is apparent that with a resistor Rx in place on clips 11 and 12, the bridge will be brought to balance once for each revolution of shaft 25, assuming that its resistance lies within the range of resistance of the device.

Connected to terminals 35 and 36 of the bridge, by means of leads 37 and 38 respectively, is an amplifier 39 which may be of any well known character, and to which power may be supplied in any suitable way. The output of the amplifier is connected to a thyratron unit 41 by means of leads 42 and 43, and the thyratron is in turn connected to the winding 44 of a relay 45 by means of leads 46 and 47.

The alarm or rejection circuit comprises a battery 49 or other source of electricity and a bell 51 or other signalling or rejection device. For instance, if desired, the resistors to be tested may be progressively advanced by a conveyor mechanism and successively placed in the bridge circuit. In such case the rejection means would take the form of a solenoid operated arm or other device which would automatically eject the resistor whose resistance fell outside of the tolerance range. Since the uses to which this circuit may be put are many and partake generally of a control function it may be conveniently referred to generically as a control circuit.

Armature 52 of relay 45 is adapted to close a switch 53, connected to battery 49 by a lead 54. The armature is connected by a lead 55 to the armature 56 of a second relay 57 and it is in turn adapted to be connected by switch 58 and a lead 59 to bell 51. The solenoid winding 61 of relay 57 is connected at one side by means of a lead 62 to alternate current power main 63. The other side of the relay is connected by a lead 64 to switch element 34. The other switch element 31 is connected by a lead 65 to the other power main 66. Mains 63 and 66 are connected directly to motor 26.

From the foregoing disclosure it is apparent that the rejection or alarm circuit will only be closed when relays 45 and 57 are both energized, and that relay 57 will be energized whenever switch element 31 rides up on one of the cam segments 27 or 28. Also, relay 45 will be energized whenever the bridge comes to balance, inasmuch as under such conditions amplifier 39 will cause thyratron 41 to trip and energize solenoid winding 44. The rejection circuit is closed only when both solenoids are energized.

In the drawing the tolerance range chosen for illustration has been designated as 68—such range being established by adjusting cam segments 27 and 28 the proper distance apart to define a notch 29 having the same angular extent. Also, by adjusting both cam segments angularly on the shaft the tolerance range may be angularly adjusted, as desired.

Taking up the operation of the device, and assuming that a resistor is in place in clips 11 and 12, and that resistor 15 is adjusted to introduce sufficient resistance to properly compensate for the temperature or humidity of the test situs, motor 26 will cause the resistance 18 to be varied through its range once every revolution of shaft 25. Assuming that the resistance of the resistor under test lies within the tolerance range, the bridge will come to balance when contact 24 is within the indicated range 68. Accordingly, since under these conditions switch element 31 has dropped down into notch 29, relay 57 will not be energized when the bridge comes to balance and the amplifier and thyratron energizes solenoid 45, and since both relays must be closed to complete the rejection circuit, no signal is given.

Assuming now that a resistor is being tested whose resistance lies either above or below the tolerance range, and that the bridge comes to balance when contact 24 is outside of the tolerance range of resistor 18, the bridge will come to balance while one of the cam segments is holding switch element 31 in its upper or closed position. This results in closing contacts 32 and 33 and energizing relay 57 at the same time that balance of the bridge, through amplifier 39 and thyratron 41, energize relay 45. Accordingly, under these conditions, both relay armatures are down, thereby closing both switches 53 and 58 and completing the alarm or rejection circuit, and giving an indication that the resistor under test should be rejected.

From the foregoing detailed disclosure it is apparent that the invention provides novel methods of and apparatus for checking the resistance of resistors in which the upper and lower resistance limits may be adjusted to accurately define a "tolerance range," and which will energize a rejection circuit whenever a resistor is tested whose resistance lies above or below the tolerance range, and which is of simple, low cost design. If desired, a wheel or endless chain type of conveyor may be employed to successively carry the resistors pass a testing station where electrical contact is automatically made to place them in the bridge circuit, and a solenoid operated device actuated by the rejection circuit, is employed to automatically reject resistors which do not come up to standard.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed, and desired to be secured by United States Letters Patent is:

1. In electrical resistance measuring apparatus; a resistor adapted to vary smoothly from a maximum to a minimum value of resistance upon continuous rotation of an associated shaft, means drivingly connected with said shaft for rotating the latter, a pair of relatively adjustable cam lobes secured to said shaft, switching means in co-operating relationship with said cam lobes and constructed and arranged to be opened and closed by said cam lobes, a bridge circuit including a pair of output terminals and having a resistor to be measured in one arm of the bridge and said variable resistor in another arm of the bridge, a first set of electromagnetically actuated normally open contacts, circuit means connected to the output terminals of said bridge including therein the electromagnet associated with said first set of contacts and having means for exciting said electromagnet when the resistance of said variable resistor bears a predetermined relation to the resistance of said resistor under test, a second set of electromagnetically actuated normally open contacts, other circuit means including said switching means for exciting the electromagnet associated with said second set of contacts when said shaft lies within a predetermined fractional arc of its complete revolution, and a control circuit including said first and second sets of normally open contacts.

2. In an electrical resistance measuring apparatus, a bridge circuit including a pair of output terminals and having a resistor to be measured in one arm of the bridge and a variable resistance in another arm of the bridge, means for causing the variable resistance to continuously vary throughout a major range, a control circuit including first and second normally non-conductive switches, a first and a second relay for controlling the actuation of said first and second switches, respectively, first circuit means connected to the output terminals of said bridge, said circuit means including said first relay and having means for energizing said first relay when the said variable resistance bears a predetermined relation to the resistance of the resistor to be measured, second circuit means including said second relay and having a third normally closed switch for controlling the energization of said second relay, and means driven in synchronism with said first named means for opening said third switch for a predetermined time interval corresponding to a minor range encompassed by said major range.

3. In an electrical resistance measuring apparatus, a bridge circuit including a pair of output terminals and having a resistor to be measured in one arm of the bridge and a variable resistance in another arm of the bridge, means for causing the variable resistance to continuously vary through a predetermined range, a control circuit including first and second normally open switches, first and second electromagnets for closing said first and second switches, respectively, circuit means including said first electromagnet connected to the output terminals of said bridge and having means therein for exciting said electromagnet when the variable resistance bears a predetermined relation to the resistance of the resistor to be measured, other circuit means including said second electromagnet and a third switch for controlling the excitation of said second electromagnet, and a cam device movable synchronously with the first named means and having a pair of relatively adjustable cam members to close the third switch when said predetermined relation lies without a selected resistance range.

ROBERT B. MARYE.

REFERENCES CITED

The following references are of record in the file of this patent:

UNITED STATES PATENTS

| Number | Name | Date |
|---|---|---|
| 1,743,386 | Paulson | Jan. 14, 1930 |
| 1,931,054 | Butterfield | Oct. 17, 1933 |
| 1,951,461 | Wilson | Mar. 20, 1934 |
| 2,060,849 | Bullard | Nov. 17, 1936 |
| 2,153,989 | Paulson | Apr. 11, 1939 |
| 2,279,232 | Graham | Apr. 7, 1942 |
| 2,321,605 | Keinath | June 15, 1943 |